(12) United States Patent
Shaffer et al.

(10) Patent No.: US 8,806,633 B2
(45) Date of Patent: Aug. 12, 2014

(54) COORDINATED DETECTION OF A GREY-HOLE ATTACK IN A COMMUNICATION NETWORK

(75) Inventors: Shmuel Shaffer, Palo Alto, CA (US); Jean-Philippe Vasseur, Saint Martin d'Uriage (FR); Jonathan W. Hui, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 142 days.

(21) Appl. No.: 13/214,874

(22) Filed: Aug. 22, 2011

(65) Prior Publication Data

US 2013/0055383 A1    Feb. 28, 2013

(51) Int. Cl.
*G08B 23/00* (2006.01)
*G06F 11/30* (2006.01)

(52) U.S. Cl.
USPC .......... 726/23; 726/14; 726/25; 709/224; 709/237; 709/244; 713/161; 713/170

(58) Field of Classification Search
USPC .......... 726/22–25, 11, 14; 709/224, 238, 237, 709/244; 713/151, 160, 170, 161
See application file for complete search history.

(56) References Cited

U.S. PATENT DOCUMENTS

| | | | | |
|---|---|---|---|---|
| 6,772,334 | B1 * | 8/2004 | Glawitsch | 713/153 |
| 6,779,033 | B1 * | 8/2004 | Watson et al. | 709/227 |
| 7,203,961 | B1 * | 4/2007 | Dalal et al. | 726/22 |
| 7,337,316 | B1 * | 2/2008 | Evans et al. | 713/162 |
| 7,464,183 | B1 * | 12/2008 | Ioffe et al. | 709/245 |
| 7,500,264 | B1 * | 3/2009 | Leavy et al. | 726/13 |
| 7,509,491 | B1 | 3/2009 | Wainner et al. | |
| 7,542,455 | B2 | 6/2009 | Grayson et al. | |
| 7,636,937 | B1 | 12/2009 | Bhattacharya et al. | |
| 7,660,983 | B1 | 2/2010 | Srivastava et al. | |
| 7,702,899 | B2 | 4/2010 | Kobozev et al. | |
| 7,774,498 | B1 | 8/2010 | Kraemer et al. | |
| 7,890,995 | B2 | 2/2011 | Shim et al. | |
| 8,285,990 | B2 * | 10/2012 | Nakhjiri | 713/168 |
| 8,627,137 | B1 * | 1/2014 | Vaidya et al. | 714/4.2 |
| 2004/0081149 | A1 * | 4/2004 | Belair et al. | 370/390 |
| 2005/0180416 | A1 * | 8/2005 | Jayawardena et al. | 370/389 |
| 2005/0216954 | A1 * | 9/2005 | Ramaiah et al. | 726/22 |
| 2006/0031575 | A1 * | 2/2006 | Jayawardena et al. | 709/239 |
| 2010/0122342 | A1 * | 5/2010 | El-Moussa et al. | 726/22 |
| 2010/0250941 | A1 * | 9/2010 | Tie et al. | 713/171 |

OTHER PUBLICATIONS

Bo Yu et al, Detecting Selective Forwarding Attacks in Wireless Sensor Networks, IEEE, 2006.*

(Continued)

*Primary Examiner* — David Garcia Cervetti
*Assistant Examiner* — Shanto M Abedin
(74) *Attorney, Agent, or Firm* — Edwards Wildman Palmer LLP; James M. Behmke; Stephen D. LeBarron

(57) ABSTRACT

In one embodiment, a security device receives one or more first unique identifications of packets sent by a first device to a second device for which a corresponding acknowledgment was purportedly returned by the second device to the first device. The security device also receives one or more second unique identifications of packets received by the second device from the first device and acknowledged by the second device to the first device. By comparing the first and second unique identifications, the security device may then determine whether acknowledgments received by the first device were truly returned from the second device based on whether the first and second unique identifications exactly match.

13 Claims, 10 Drawing Sheets

(56) References Cited

OTHER PUBLICATIONS

Soufine Djahel et al, An Acknowledgement-Based Scheme to Defend Against Cooperative Black Hole Attacks in Optimized Link State Routing Protocol, IEEE, 2008.*

Nan Kang et al, Detecting Forged Acknowledgements in MANETs, 2011 International Conference on Advanced Information Networking and Applications, Mar. 2011.*

"RPL: IPv6 Routing Protocol for Low Power and Lossy Networks" <draft-ietf-roll-rpl-19> by Winter, at al. (Mar. 13, 2011 version).

* cited by examiner

US 8,806,633 B2

COORDINATED DETECTION OF A GREY-HOLE ATTACK IN A COMMUNICATION NETWORK

TECHNICAL FIELD

The present disclosure relates generally to communication networks, and, more particularly, to detecting grey-hole attacks in computer networks, such as low power and lossy networks (LLNs).

BACKGROUND

Mesh networks may become a target for a variety of malicious attacks. The first and possibly most important step in defending against a malicious attack is detecting that such an attack has been launched against the network. A "grey-hole attack," in particular, is an attack by a malicious node where the malicious node (MN) discards either some or all of the packets that it was asked to forward by neighboring nodes rather than forwarding them to their intended destination (e.g., to a root node, head-end, application end-point, etc.). This issue is even more problematic when combined with attacks on control protocols. For example, the MN could manage to attack the routing protocol, advertise good paths, and attract additional traffic. The MN may determine which packets it should drop either by examining the content of the packets and discarding specific packets, or, in case the packets are end-to-end encrypted, the ML may randomly select packets and discard them.

The head-end could mitigate this attack by signing and potentially encrypting each one of the acknowledgment (ACK) messages it sends to the originating node. However, in Low power and Lossy Networks (LLNs) that employ low power processors, the overhead of encrypting and decrypting each message may be prohibitive. In particular, LLNs (e.g., sensor networks) have a myriad of applications, such as Smart Grid and Smart Cities, though various challenges are presented with LLNs, such as lossy links, low bandwidth, battery operation, low memory and/or processing capability, etc.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
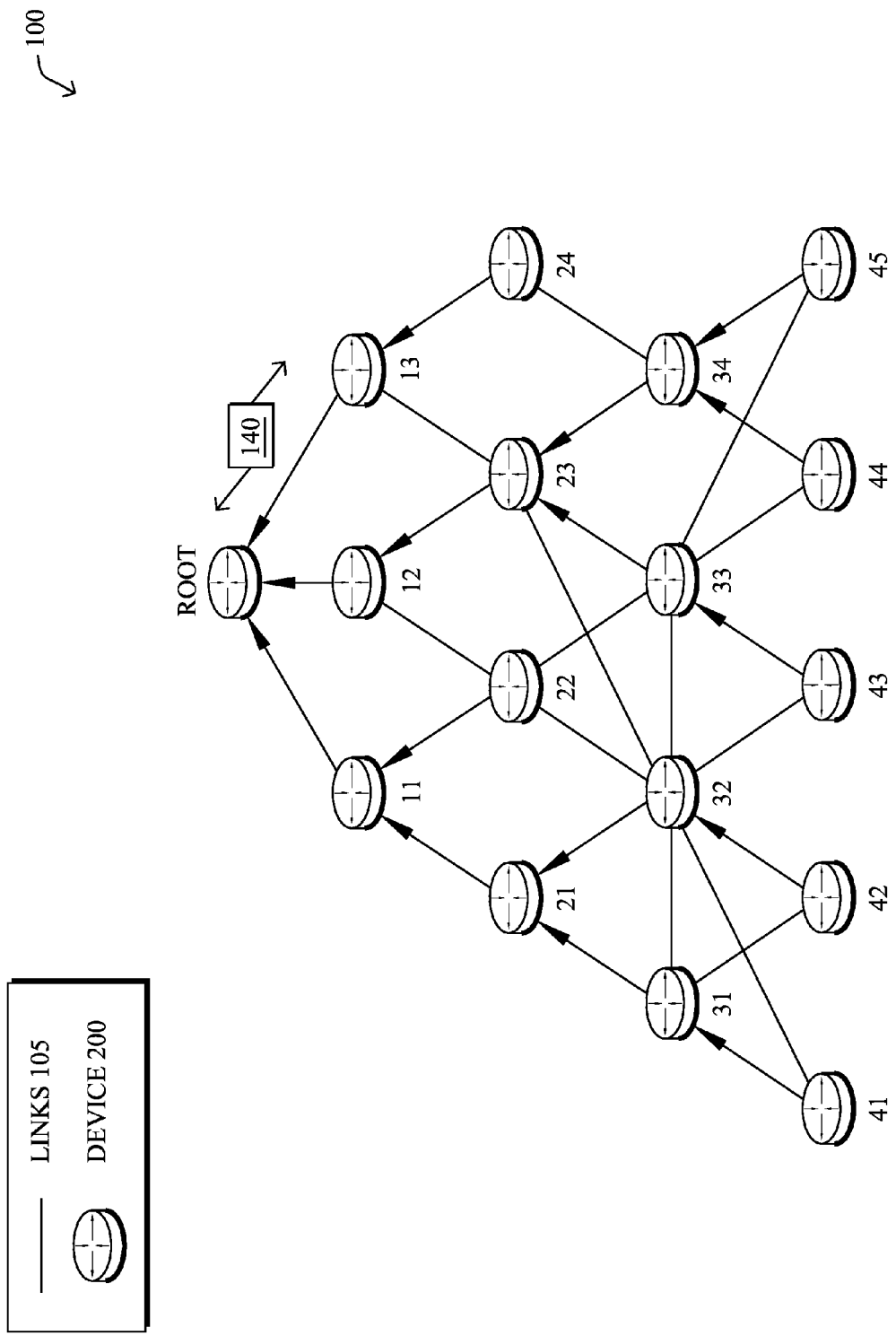
FIG. 1 illustrates an example communication network.

According to one or more embodiments of the disclosure, a security device (e.g., on a head-end) receives one or more first unique identifications of packets sent by a first device to a second device for which a corresponding acknowledgment was purportedly returned by the second device to the first device. The security device also receives one or more second unique identifications of packets received by the second device from the first device and acknowledged by the second device to the first device. By comparing the first and second unique identifications, the security device may then determine whether acknowledgments received by the first device were truly returned from the second device based on whether the first and second unique identifications exactly match.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 (e.g., labeled as shown, "root," "11," "12," ... "45," and described in FIG. 2 below) interconnected by various methods of communication. For instance, the links 105 may be wired links or shared media (e.g., wireless links, PLC links, etc.), where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
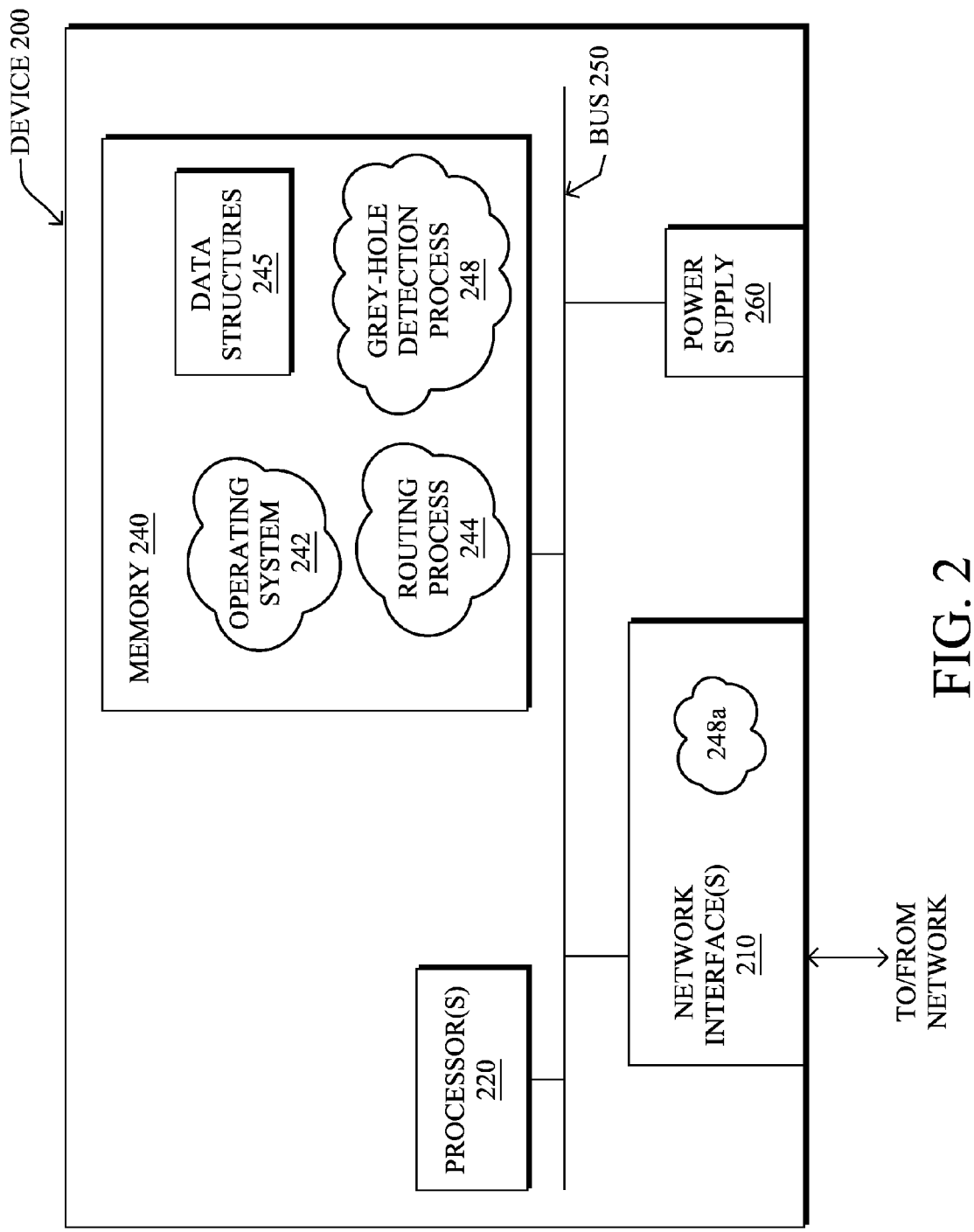
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative grey-hole detection process 248, as described herein. Note that while grey-hole detection process 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

As further noted above, mesh networks may become a target for a variety of malicious attacks. The first and possibly most important step in defending against a malicious attack is detecting that such an attack has been launched against the network. A "grey-hole attack," in particular, is an attack by a malicious node where the malicious node (MN) discards either some or all of the packets that it was asked to forward by neighboring nodes rather than forwarding them to their intended destination (e.g., to a root node, head-end, application end-point, etc.). This issue is even more problematic when combined with attacks on control protocols. For example, the MN could manage to attack the routing protocol, advertise good paths, and attract additional traffic. The MN may determine which packets it should drop either by examining the content of the packets and discarding specific packets, or, in case the packets are end-to-end encrypted, the ML may randomly select packets and discard them.

The head-end could mitigate this attack by signing and potentially encrypting each one of the acknowledgment (ACK) messages it sends to the originating node. However, in LLNs that employ low power processors, the overhead of encrypting and decrypting each message may be prohibitive.

Detection of Grey-Hole Attacks

The techniques herein provide a manner in which a security device, which may be co-located with the root node or the head-end, can identify that the mesh network is under a grey-hole attack without adding the overhead of signing and encryption/decryption of each acknowledgement message. That is, the techniques herein provide a low computation system for detecting a grey-hole malicious attack (by a compromised node or a maliciously inserted node) in mesh networks The techniques, in particular, add only negligible additional message flow to the network, which is especially suitable for LLNs.

Specifically, according to one or more embodiments of the disclosure as described in detail below, a security device (e.g., on a head-end) receives one or more first unique identifications of packets sent by a first device to a second device for which a corresponding acknowledgment was purportedly returned by the second device to the first device. The security device also receives one or more second unique identifications of packets received by the second device from the first device and acknowledged by the second device to the first device. By comparing the first and second unique identifications, the security device may then determine whether acknowledgments received by the first device were truly returned from the second device based on whether the first and second unique identifications exactly match.

Illustratively, the techniques described herein may be performed by hardware, software, and/or firmware, such as in accordance with the grey-hole detection process 248/248a, which may contain computer executable instructions executed by the processor 220 (or independent processor of interfaces 210) to perform functions relating to the novel techniques described herein. For example, the techniques herein may be treated as extensions to conventional protocols, such as the RPL protocol or other shared-media communication protocols, and as such, may be processed by similar components understood in the art that execute those protocols, accordingly.

Figure 3A:
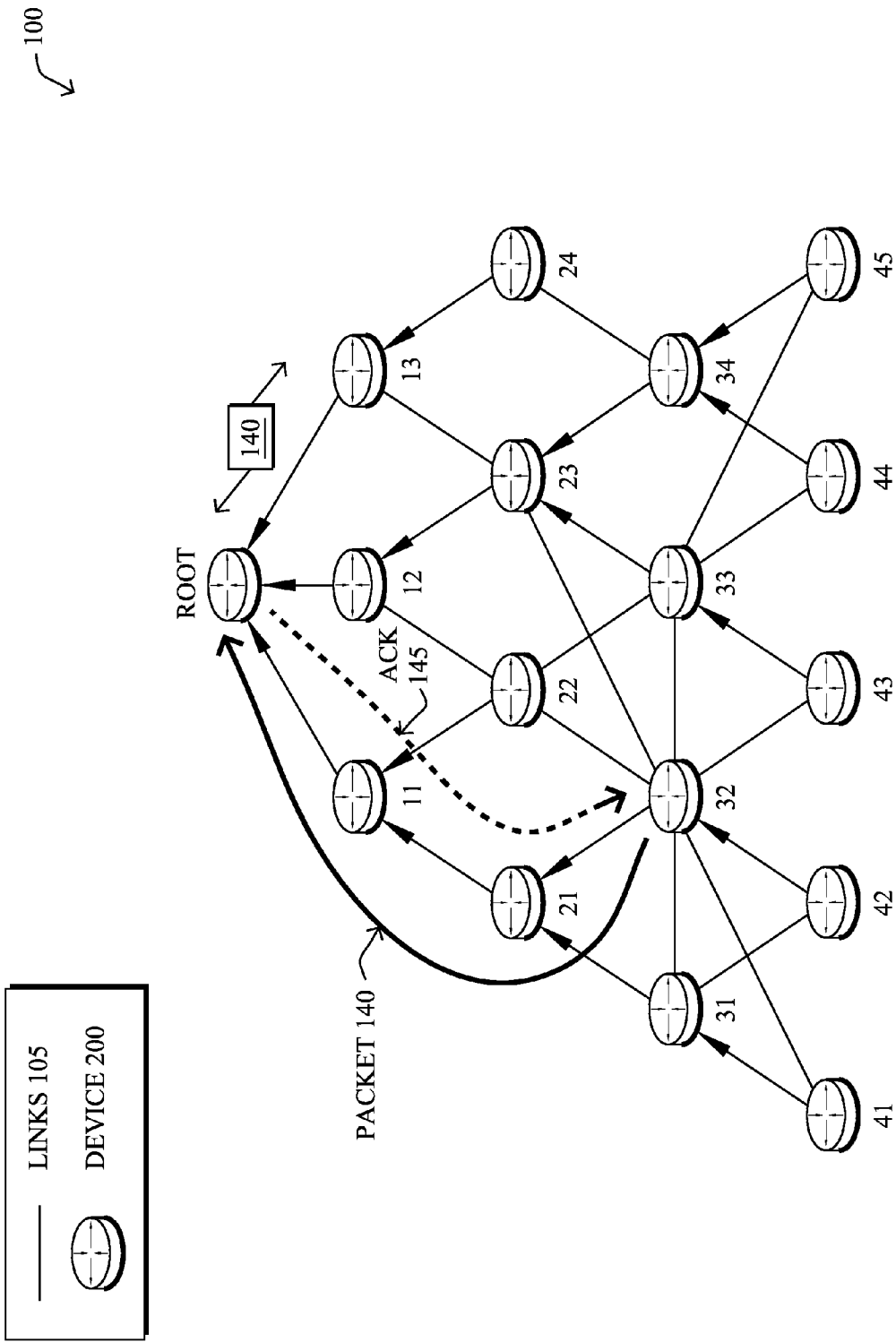
FIGS. 3A-3C illustrate an example grey-hole attack in the network.
Figure 3B:
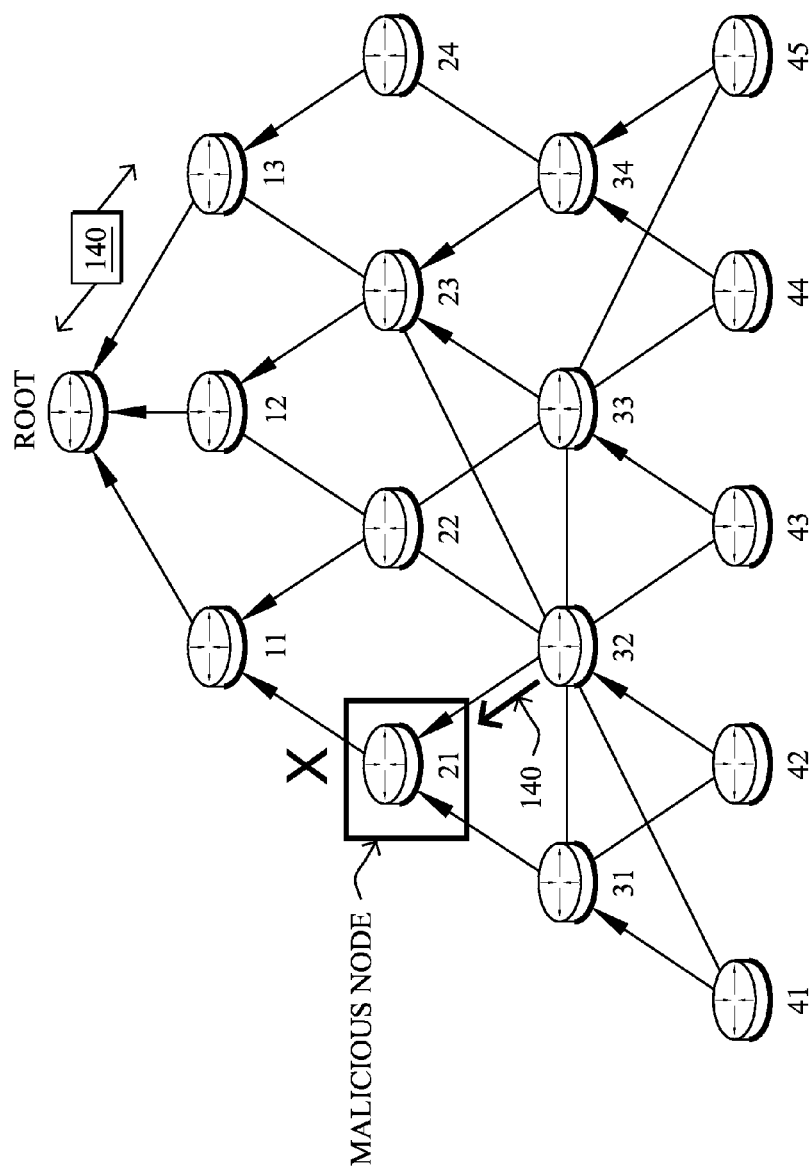
Figure 3C:
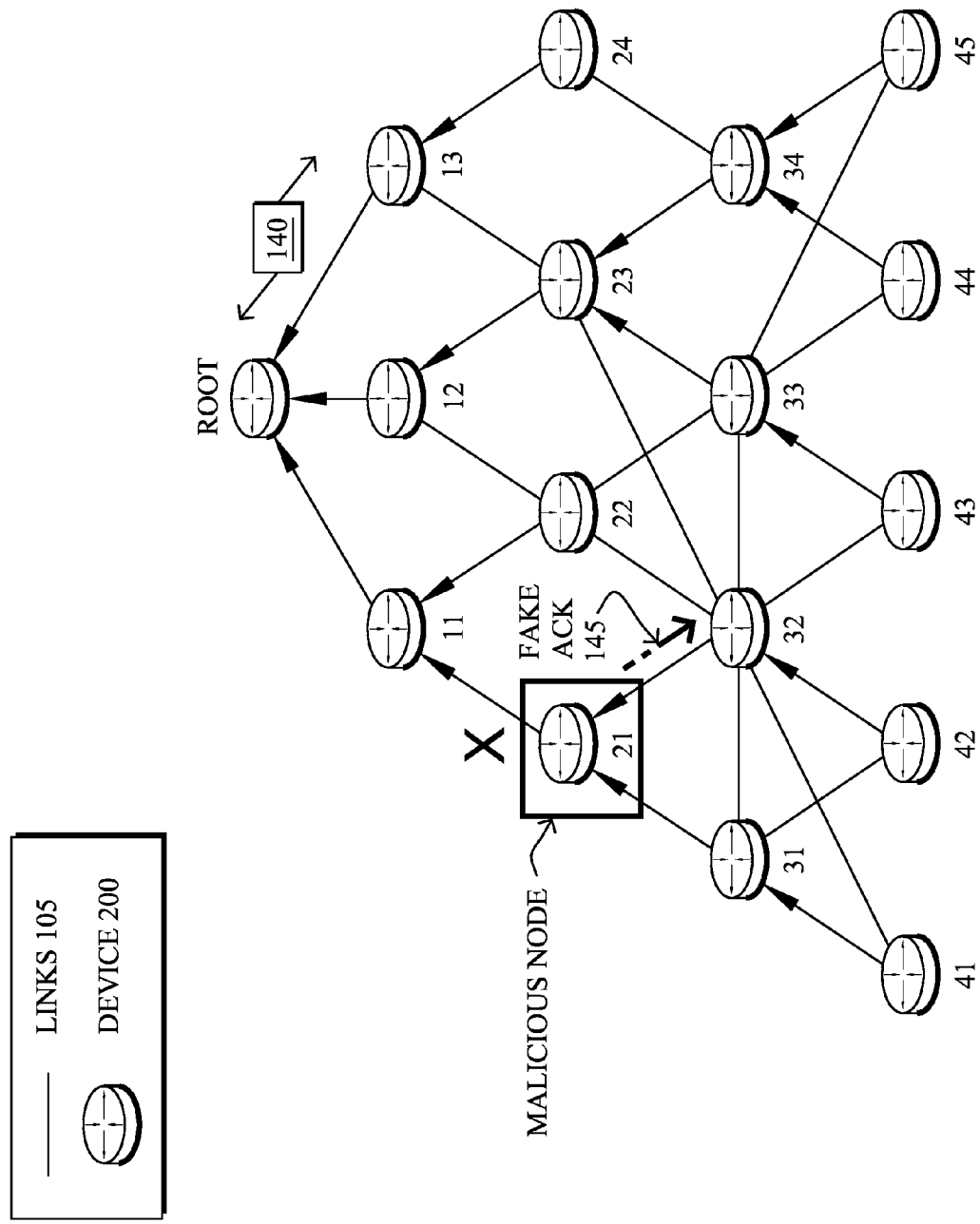

FIGS. 3A-3C illustrate an example grey-hole attack in the network. For instance, assume that node 32 desires to send a packet 140 to the root node (e.g., a head-end application). As shown in FIG. 3A, the intended sequence of events is for the packet 140 to traverse an upward path (e.g., according to a DAG or other preferred next-hop/parent route as shown by the arrows in FIGS. 1 and 3A) via node 21, node 11, and finally to the root node. In response, upon receiving the packet 140, the root node (e.g., an application at the root node) returns an acknowledgment 145 toward the sending node 32, generally following the same return path in reverse (e.g., node 11, node 21, node 32).

Assuming a mesh network in which one or more nodes has been compromised and has become a malicious node (MN), however, this MN may attempt to disturb normal operations by launching a grey-hole attack. As part of this attack, as shown in FIG. 3B, the MN selects certain received packets and, rather than forwarding them to the intended destination (e.g., head-end), it discards them. Shortly thereafter, as shown in FIG. 3C, the MN generates and sends a fake acknowledgement 145 to the original packet originator node 32 making the originating node falsely believe that the packet successfully arrived at the destination. (That is, without the techniques herein, the grey-hole attack is generally undetectable, since the packets are acknowledged as reaching the intended destination.)

Operationally, therefore, the techniques described herein detect a grey-hole attack using a coordinated approach between the sender (originator) and receiver (destination) of the packets and acknowledgments. In accordance with the techniques herein, each node in the network may maintains a running list of unique identifications of all of the packets for which it receives an acknowledgement from the intended destination (e.g., the head-end. Similarly, the destination (e.g., head-end) keeps a running list of unique identifications (for each node) of all the packets it acknowledges to originating nodes, accordingly. Note that illustratively, the unique packet identifications may be hashes of the packets based on deterministic hash functions shared by the nodes in the network (i.e., where each node performing a hash function on the same packet will produce an identical unique hash/identification for the packet).

Specifically, when a sender device sends packets 140 to a receiver device, and later receives a corresponding acknowledgment 145 purportedly returned by the receiver device, the sender device may store the unique identification of the acknowledged packet. Additionally, each time the receiver device receives a packet 140 and returns the corresponding acknowledgment 145, it also stores a unique identification for each of the correspondingly acknowledged packets. Note that the techniques herein may be applied to all packets or alternatively only to particular types of packets, e.g., priority packets, control packets, user data packets, packets at a particular time, etc.

Figure 4:
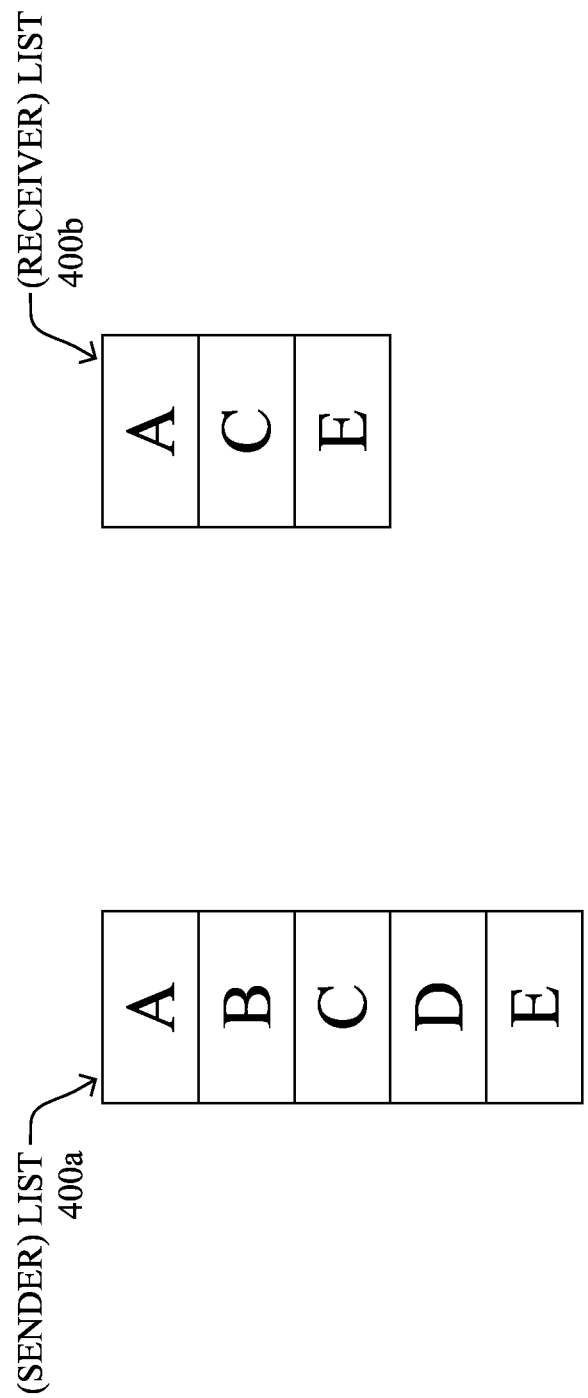
FIG. 4 illustrates examples of acknowledged packet identification lists.

FIG. 4 illustrates examples of acknowledged packet identification lists 400a (sender) and 400b (receiver) that may be generated by each node in the network, e.g., as a data structure 245. As shown, for example, the sender node (e.g., node 32) has sent and received acknowledgments for packets A-E (where A-E indicate the unique packet identification/hash function result), and (assuming that the MN discarded and falsely acknowledged packets B and D) the receiver node (e.g., root node/head-end) has truly returning acknowledgments for packets A, C, and E. Note that the lists 400 are specific to the sender-receiver pair, and that when used in certain MP2P (multipoint-to-point) networks, the senders may maintain a single list (e.g., all packets are sent to a single destination), while the receiver (e.g., root node/head-end) may maintain a list for each node in the network.

According to the techniques herein, each node periodically (e.g., every few days) sends its running list 400 (e.g., its hash information) to a security device, such as a network management server (NMS), or else a security manager application (grey-hole detection process 248) in the head-end. Note that the periodicity of the communication may be configured dynamically (e.g., in response to suspicion of grey-holes), or else may be based on other factors, such as a number of packet identifications in the list to send a specific number of unique identifications for a plurality of corresponding packets to the security device. Note further that the communication protocol may be configured to prevent the attacker from modifying the hash lists or faking the lists, such as by dictating that a diverse path be used to relay the list to the security device and/or by encrypting the specific message with its own unique private key.

The security device/manager examines the lists 400a and 400b (e.g., the running hash information) it receives from each node and compares them together to seek any discrepancies. For instance, in embodiments where the security device is the sender device or the receiver device, the security device may compare the received list(s) to its own list, accordingly.

Figure 5:
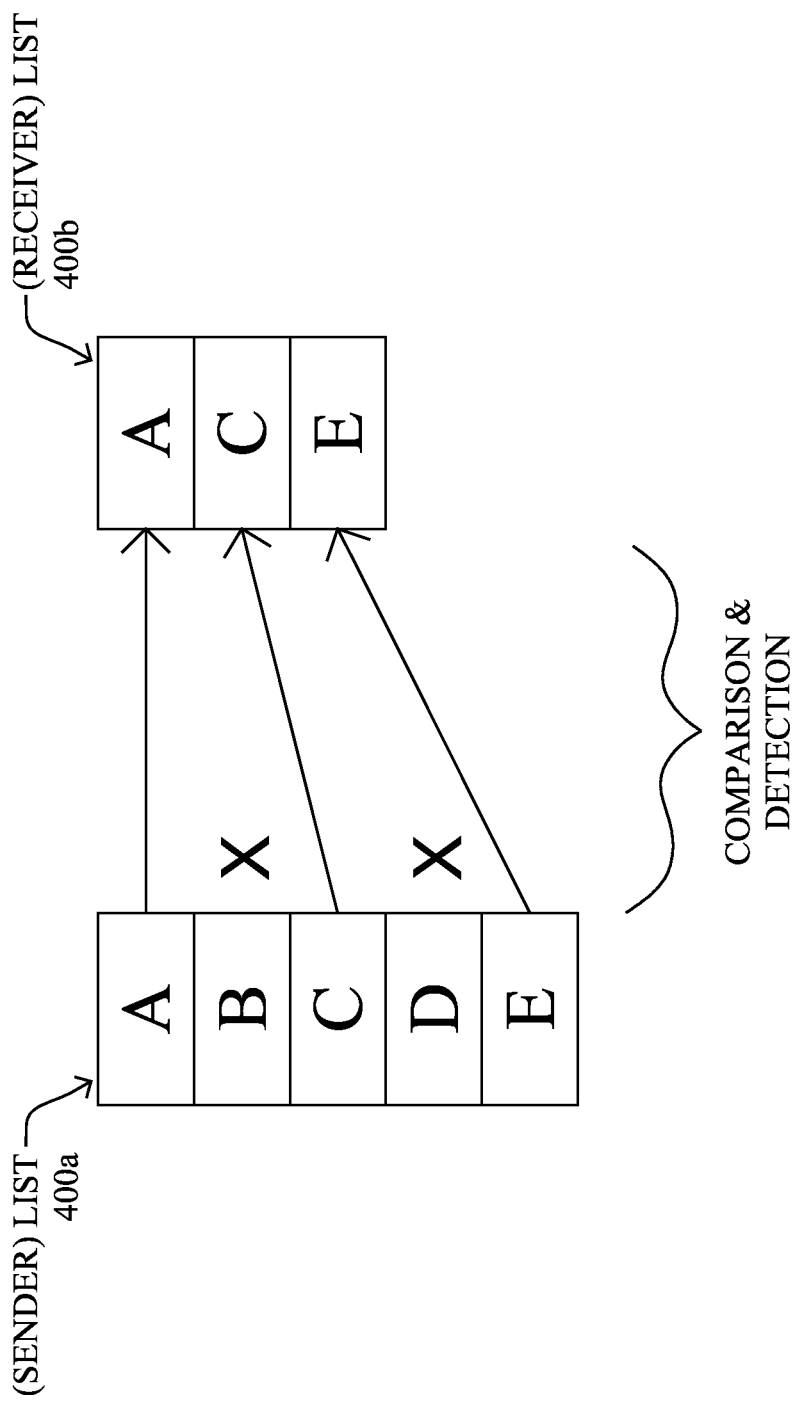
FIG. 5 illustrates an comparison between the packet identification lists to cooperatively detect grey-holes.

FIG. 5 illustrates an example comparison between the packet identification lists 400 to cooperatively detect grey-holes, i.e., by determining whether acknowledgments received by the first/sender device were truly returned from the second/receiver device based on whether the unique identifications of the lists exactly match. In other words, if the two lists of packet IDs/hashes are not identical, i.e., determining no matching receiver unique identification for a particular sender unique identification (e.g., packets B and D), the security device determines that at least one node has been compromised in the network and may generate an alarm in response, e.g., to alert a network administrator.

The network administrator may initiate mitigation activities, such as further monitoring of suspicious nodes (e.g., nodes along the path between the originating node 32 and the root/head-end), initiating a download of a new code to all nodes in the vicinity of the running hash discrepancy, changing security keys, or sending a crew to replace the suspicious nodes, etc. Note that the techniques herein generally do not specifically indicate which node is acting as the MN of the grey-hole attack, but merely indicates the possibility of such an attach, and alerts a network administrator or automated application of any suspected grey-hole security breach, such that the specific mitigation actions may be performed by the network administrator, e.g., for removing malicious node, which are generally well known and not specifically described herein.

Notably, without a grey-hole attack, the lists 400 are generally guaranteed to be in sync between the corresponding end-point nodes, removing the possibility of false positives. In particular, even though the illustrative LLNs are a particularly lossy environment, the system generally accounts for lost transmissions (or re-transmissions) of the packets 140 and/or acknowledgments 145. For instance, if a packet 140 is lost, there is no acknowledgment 145, and thus no entry in either list. If, on the other hand, an acknowledgment is sent and lost before received by the originating node, the receiving node will have entered a new packet identification to its list 400b, but the originating node will not have entered this packet identification (since no acknowledgment was received). This problem, barring certain timing consideration, is soon mitigated, since the originating node will generally re-transmit the same packet in response to not having received the acknowledgment. Provisions may be made to ensure that the hash would still be the same for the first packet and any retransmitted packet, and that the receiver could remove duplicate identifications from its list. Alternatively, the comparison between the two lists may not cause an alarm in the event that an acknowledgment was sent and not received, i.e., where the receiving/destination node's list 400b has one or more entries that are not in the sending/originating node's list 400a.

Figure 6:
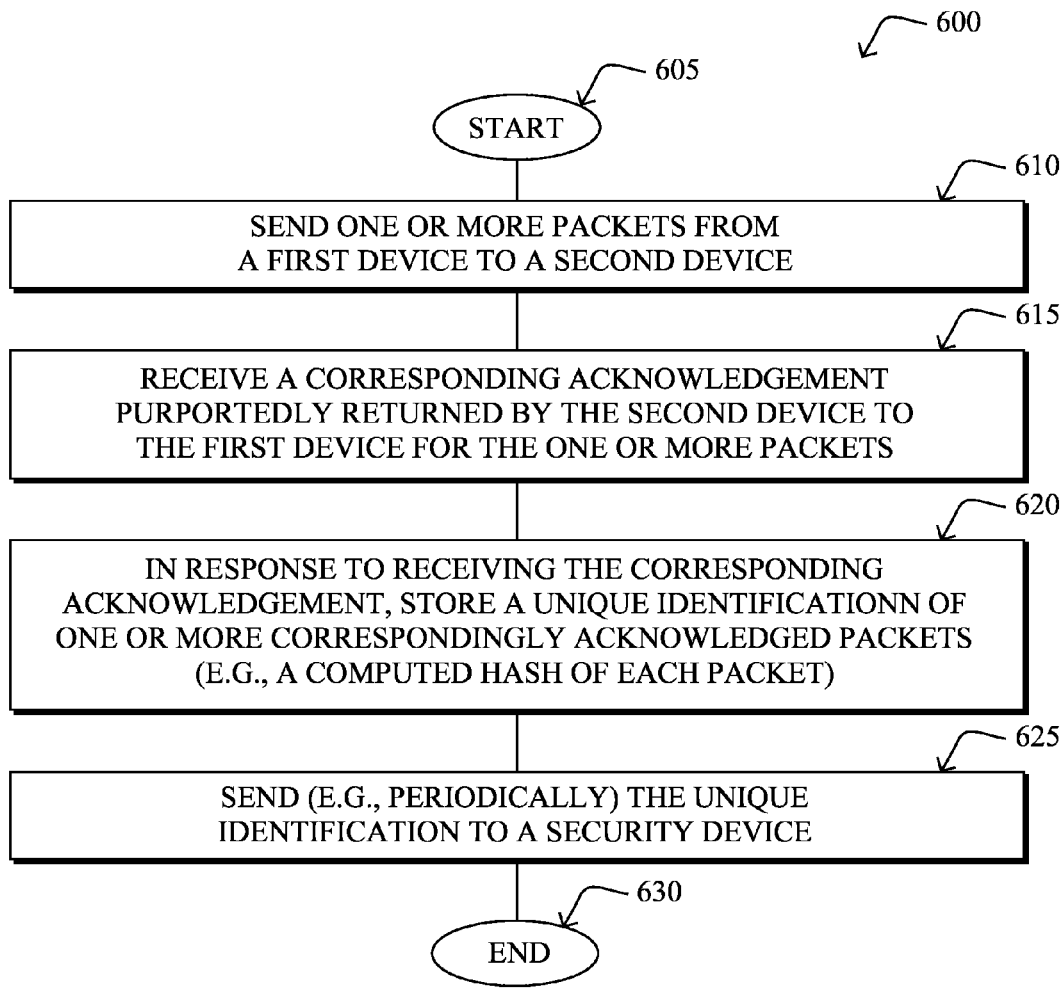
FIG. 6 illustrates an example simplified procedure for cooperatively detecting grey-hole attacks in a communication network, e.g., from the perspective of the sending device (first device)

FIG. 6 illustrates an example simplified procedure for cooperatively detecting grey-hole attacks in a communication network in accordance with one or more embodiments described herein, e.g., from the perspective of the sending device (first device). The procedure 600 starts at step 605, and continues to step 610, where, as described in greater detail above, the sending node (e.g., node 32) sends one or more packets 140 to a second/receiver device (e.g., the root node). In response to receiving a corresponding acknowledgment 145 in step 615, purportedly returned by the second device for the one or more packets, in step 620 the sending node stores a unique identification of one or more correspondingly acknowledged packets (e.g., a computed hash of each packet), as described above. In step 625, the sending device may send (e.g., periodically) the unique identification to a security device, which as described herein compares the one or more unique identifications from the first device to one or more unique identifications from the second device for packets received by the second device from the first device and acknowledged by the second device to the first device to determine whether the acknowledgments received by the first device were truly returned from the second device based on whether the first and second unique identifications exactly match. The procedure 600 ends in step 630.

Figure 7:
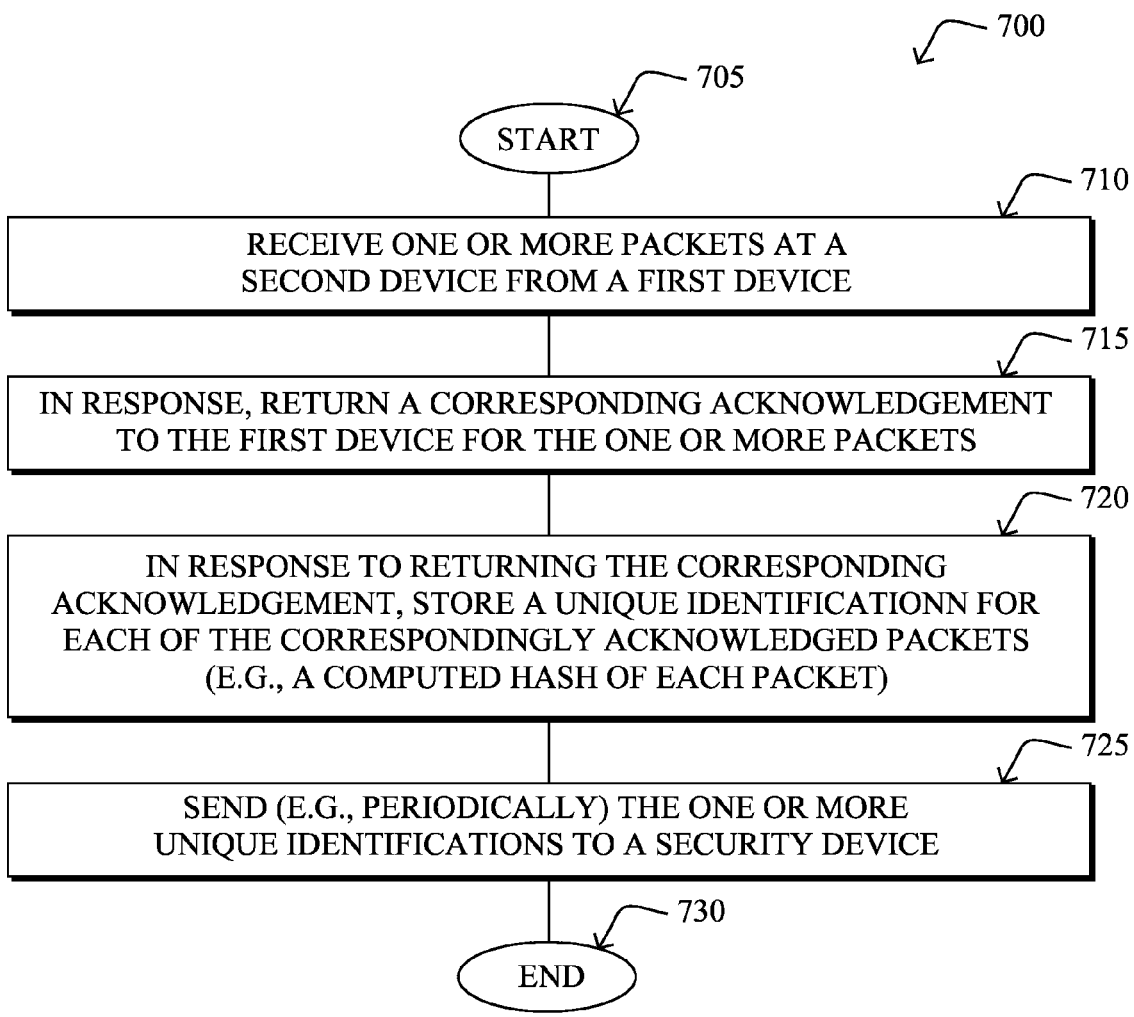
FIG. 7 illustrates an example simplified procedure for cooperatively detecting grey-hole attacks in a communication network, e.g., from the perspective of the receiving device (second device)

In addition, FIG. 7 illustrates an example simplified procedure for cooperatively detecting grey-hole attacks in a communication network in accordance with one or more embodiments described herein, e.g., from the perspective of the receiving device (second device). The procedure 700 starts at step 705, and continues to step 710, where, as described in greater detail above, the receiving device (e.g., root node) receives one or more packets 140 from a first device (e.g., node 32). In response, in step 715, the receiving device returns a corresponding acknowledgment 145 to the first device for the one or more packets, and in step 720 stores a unique identification for each of the correspondingly acknowledged packets (e.g., a computed hash of each packet). Accordingly, as described herein, in step 725 the receiving device may also send (e.g., periodically) the one or more unique identifications to a security device that compares the one or more unique identifications from the second device to one or more unique identifications of packets sent by the first device to the second device, for which a corresponding acknowledgment was purportedly returned by the second device to the first device, to determine whether the acknowledgments received by the first device were truly returned from the second device based on whether the first and second unique identifications exactly match. The illustrative procedure 700 ends in step 730.

Figure 8:
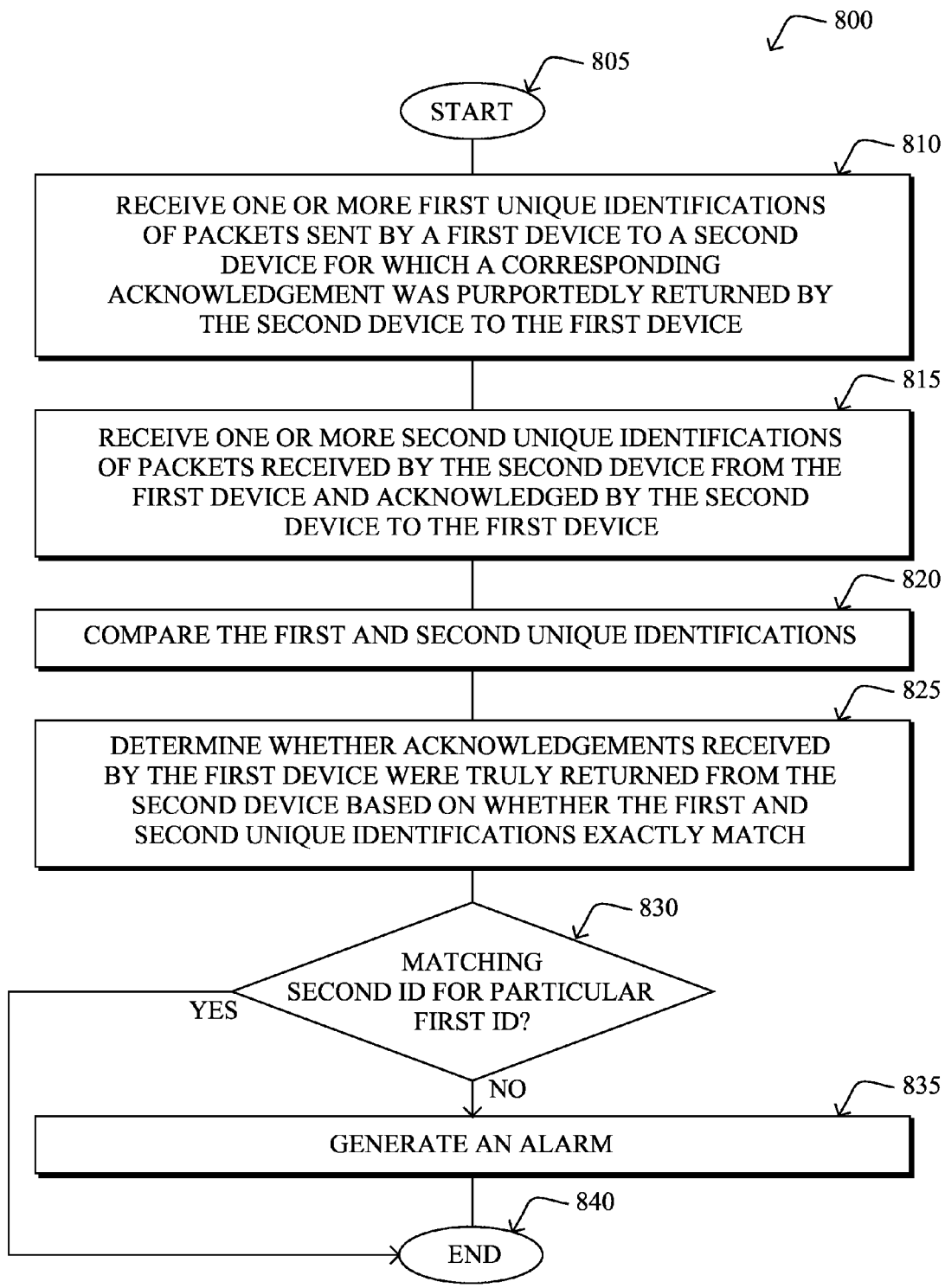
FIG. 8 illustrates an example simplified procedure for cooperatively detecting grey-hole attacks in a communication network, e.g., from the perspective of the security device.

Lastly, FIG. 8 illustrates an example simplified procedure for cooperatively detecting grey-hole attacks in a communication network in accordance with one or more embodiments described herein, e.g., from the perspective of the security device. The procedure 800 starts at step 805, and continues to step 810, where, as described in greater detail above, the security device (e.g., the first/sender device or second/receiver device herein) may receive one or more first unique identifications (e.g., hashes) of packets sent by a first device to a second device for which a corresponding acknowledgment was purportedly returned by the second device to the first device, and in step 815 may receive one or more second unique identifications (e.g., hashes) of packets received by the second device from the first device and acknowledged by the second device to the first device. Note that in certain embodiments as noted above, the communication of the unique identifications (e.g., hashes) may be encrypted, and as such, another step to decrypt the received communications may be required prior to proceeding. In particular, by encrypting the exchange of the unique identifications, and also illustratively not encrypting other traffic, the overall computation requirements of the nodes in the network is reduced, yet the exchange of the grey-hole detection information remains secure.

In step 820, the security device compares the first and second unique identifications (lists 400a and 400b) to determine whether acknowledgments received by the first device were truly returned from the second device based on whether the first and second unique identifications exactly match in step 825. If in step 830 there is no matching second ID for a particular first ID, then in step 835 the security device may generate an alarm, accordingly. The procedure 800 ends in step 840.

It should be noted that while certain steps within procedures 600-800 may be optional as described above, the steps shown in FIGS. 6-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-800 are described separately, certain steps from each procedure may be incorporated into each other procedure, and the procedures are not meant to be mutually exclusive.

The novel techniques described herein, therefore, cooperatively detect grey-hole attacks in a communication network. In particular, the techniques herein detect a malicious grey-hole attack by illustratively adding a low computation running hash calculation to each node and periodically forwarding the running hash function to the security device (e.g., head-end). The techniques require minimal additional packet exchange (e.g., periodically sending one additional message, for example, once every three days) and as such is suitable for LLNs with limited bandwidth such as AMI. Further, the techniques herein provide the described functionality while requiring only minimal additional computation at the security device, e.g., head-end, considerably less than encrypting and signing of each message, which is critical for certain types of networks (e.g., home automation) that don't sign messages and only use a PAN-wide network key.

While there have been shown and described illustrative embodiments that cooperatively detect grey-hole attacks in a communication network, it is to be understood that various other adaptations and modifications may be made within the spirit and scope of the embodiments herein. For example, the embodiments have been shown and described herein with relation to LLNs in particular. However, the embodiments in their broader sense are not as limited, and may, in fact, be used with other types of networks. In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a security device in a communication network, a first set of one or more unique identifications of packets sent by a first device to a second device for which a corresponding acknowledgment was purportedly returned by the second device to the first device;
   receiving, at the security device, a second set of one or more unique identifications of packets received by the second device from the first device and acknowledged by the second device to the first device;
   comparing the first and second sets of unique identifications; and
   determining whether acknowledgments received by the first device were truly returned from the second device based on whether the unique identifications in the first and second sets exactly match and the sets include an equal number of unique identifications, wherein the unique identifications are hashes of the packets.

2. The method as in claim 1, further comprising:
   determining that no matching unique identification in the second set exists for a particular unique identification in the first set; and
   in response, generating an alarm.

3. A method, comprising:
   sending one or more packets from a first device in a communication network to a second device;
   receiving a corresponding acknowledgment purportedly returned by the second device to the first device for the one or more packets;
   in response to receiving the corresponding acknowledgment, storing a unique identification of one or more correspondingly acknowledged packets; and
   sending the unique identification to a security device that compares a first set of one or more unique identifications from the first device to a second set of one or more unique identifications from the second device for packets received by the second device from the first device and acknowledged by the second device to the first device to determine whether the acknowledgments received by the first device were truly returned from the second device based on whether the unique identifications in the first and second sets exactly match and the sets include an equal number of unique identifications, wherein the unique identifications are hashes of the packets.

4. The method as in claim 3, wherein sending comprises:
periodically sending a plurality of unique identifications for a plurality of corresponding packets to the security device.

5. The method as in claim 3, wherein storing and sending the unique identification of the correspondingly acknowledged packet is in response to the correspondingly acknowledged packet being a particular type of packet.

6. A method, comprising:
receiving one or more packets at a second device in a communication network from a first device;
in response, returning a corresponding acknowledgment to the first device for the one or more packets;
in response to returning the corresponding acknowledgment, storing a unique identification for each of the correspondingly acknowledged packets; and
sending the one or more unique identifications to a security device that compares a second set of one or more unique identifications from the second device to a first set of one or more unique identifications of packets sent by the first device to the second device, for which a corresponding acknowledgment was purportedly returned by the second device to the first device, to determine whether the acknowledgments received by the first device were truly returned from the second device based on whether the unique identifications in the first and second sets exactly match and the sets include an equal number of unique identifications, wherein the unique identifications are hashes of the packets.

7. The method as in claim 6, wherein sending comprises:
periodically sending a plurality of unique identifications for a plurality of corresponding packets to the security device.

8. The method as in claim 6, wherein storing and sending the unique identification of the correspondingly acknowledged packet is in response to the correspondingly acknowledged packet being a particular type of packet.

9. The method as in claim 6, wherein the second device is a head-end device.

10. An apparatus, comprising:
one or more network interfaces to communicate within a communication network;
a processor coupled to the network interfaces and adapted to execute one or more processes; and
a memory configured to store a process executable by the processor, the process when executed operable to:
receive a first set of one or more first unique identifications of packets sent by a first device to a second device for which a corresponding acknowledgment was purportedly returned by the second device to the first device;
receive a second set of one or more second unique identifications of packets received by the second device from the first device and acknowledged by the second device to the first device;
compare the first and second sets of unique identifications; and
determine whether acknowledgments received by the first device were truly returned from the second device based on whether the unique identifications in the first and second sets exactly match and the sets include an equal number of unique identifications, wherein the unique identifications are hashes of the packets.

11. The apparatus as in claim 10, wherein the process when executed is further operable to:
determine that no matching unique identification in the second set exists for a particular unique identification in the first set; and
in response, generate an alarm.

12. An apparatus, comprising:
one or more network interfaces to communicate within a communication network;
a processor coupled to the network interfaces and adapted to execute one or more processes; and
a memory configured to store a process executable by the processor, the process when executed operable to:
send one or more packets to a second device;
receive a corresponding acknowledgment purportedly returned by the second device to the apparatus for the one or more packets;
in response to receiving the corresponding acknowledgment, store a unique identification of one or more correspondingly acknowledged packets; and
send the unique identification to a security device that compares a first set of the one or more unique identifications from the apparatus to a second set of one or more unique identifications from the second device for packets received by the second device from the apparatus and acknowledged by the second device to the apparatus to determine whether the acknowledgments received by the apparatus were truly returned from the second device based on whether the unique identifications in the first and second sets exactly match and the sets include an equal number of unique identifications, wherein the unique identifications are hashes of the packets.

13. An apparatus, comprising:
one or more network interfaces to communicate within a communication network;
a processor coupled to the network interfaces and adapted to execute one or more processes; and
a memory configured to store a process executable by the processor, the process when executed operable to:
receive one or more packets from a first device;
in response, return a corresponding acknowledgment to the first device for the one or more packets;
in response to returning the corresponding acknowledgment, store a unique identification for each of the correspondingly acknowledged packets; and
send the one or more unique identifications to a security device that compares a second set of the one or more unique identifications from the apparatus to a first set of one or more unique identifications of packets sent by the first device to the apparatus, for which a corresponding acknowledgment was purportedly returned by the apparatus to the first device, to determine whether the acknowledgments received by the first device were truly returned from the apparatus based on whether the unique identifications in the first and second sets exactly match and the sets include an equal number of unique identifications, wherein the unique identifications are hashes of the packets.

* * * * *